US011747443B2

(12) United States Patent
Ramesh et al.

(10) Patent No.: US 11,747,443 B2
(45) Date of Patent: Sep. 5, 2023

(54) NON-CONTACT IDENTIFICATION OF MULTI-PERSON PRESENCE FOR ELDERLY CARE

(71) Applicant: Tellus You Care, Inc., San Francisco, CA (US)

(72) Inventors: Srivatsan Ramesh, Redwood City, CA (US); Kevin Hsu, San Francisco, CA (US); Huiyuan Tan, Sunnyvale, CA (US); Tania Abedian Coke, San Francisco, CA (US)

(73) Assignee: Tellus You Care, Inc., San Francisco, CA (US)

(*) Notice: Subject to any disclaimer, the term of this patent is extended or adjusted under 35 U.S.C. 154(b) by 401 days.

(21) Appl. No.: 16/930,550

(22) Filed: Jul. 16, 2020

(65) Prior Publication Data

US 2021/0041554 A1 Feb. 11, 2021

Related U.S. Application Data

(60) Provisional application No. 62/882,899, filed on Aug. 5, 2019.

(51) Int. Cl.
*G01S 7/41* (2006.01)
*G01S 13/72* (2006.01)
(Continued)

(52) U.S. Cl.
CPC .............. *G01S 7/415* (2013.01); *G01S 7/41* (2013.01); *G01S 13/42* (2013.01); *G01S 13/726* (2013.01);
(Continued)

(58) Field of Classification Search
CPC ........ G01S 13/726; G01S 13/42; G01S 13/56; G01S 7/415; G01S 7/41; G06T 7/246;
(Continued)

(56) References Cited

U.S. PATENT DOCUMENTS 7,596,241 B2 * 9/2009 Rittscher ............... G06V 20/53
382/173
7,916,066 B1 * 3/2011 Osterweil ............. A61B 5/1117
382/115

(Continued)

OTHER PUBLICATIONS

Girondel, Vincent & Caplier, Alice & Bonnaud, Laurent. (2004). Real-time tracking of multiple persons by Kalman filtering and face pursuit for multimedia applications (Year: 2004).*

(Continued)

*Primary Examiner* — Peter M Bythrow
(74) *Attorney, Agent, or Firm* — Muirhead and Saturnelli, LLC

(57) ABSTRACT

Detecting multiple people in a room includes detecting a point cloud corresponding to at least one user moving in the room, forming a bounding box corresponding to coordinates of points of the point cloud, and determining if the point cloud corresponds to multiple people based on a size of the point cloud, a presence of separate clusters of points in the point cloud, and/or detecting one or more people entering or leaving the room. Detecting a point cloud may include using a tracking device. The size of the point cloud may be compared with a size of a point cloud corresponding to a single user of the room. Detecting one or more people entering or leaving the room may include previously detecting entrances of the room by tracking movement of people in the room and determining a location where movement results in more or less people in the room.

26 Claims, 9 Drawing Sheets

(51) Int. Cl.
*G06T 7/246* (2017.01)
*G06T 7/277* (2017.01)
*G01S 13/42* (2006.01)
*G06V 10/25* (2022.01)
*G06V 10/762* (2022.01)
*G06V 20/52* (2022.01)

(52) U.S. Cl.
CPC ............ *G06T 7/246* (2017.01); *G06T 7/277* (2017.01); *G06V 10/25* (2022.01); *G06V 10/7635* (2022.01); *G06V 20/53* (2022.01); *G06T 2207/10028* (2013.01); *G06T 2207/10044* (2013.01); *G06T 2207/30196* (2013.01)

(58) Field of Classification Search
CPC ........... G06T 7/277; G06T 2207/10028; G06T 2207/10044; G06T 2207/30196; G06V 2201/12; G06V 10/7635; G06V 10/25; G06V 20/53; G08B 21/0423; G08B 21/043; H04L 67/10; H04L 67/22
See application file for complete search history.

(56) References Cited

U.S. PATENT DOCUMENTS

| | | | | |
|---|---|---|---|---|
| 8,213,679 B2* | 7/2012 | Yao | ............ | G06T 7/20 382/167 |
| 8,228,382 B2* | 7/2012 | Pattikonda | ........... | G06V 40/161 348/169 |
| 8,295,545 B2* | 10/2012 | Hampapur | .............. | G06T 7/251 382/209 |
| 8,355,576 B2* | 1/2013 | Tu | .......................... | G06V 20/53 382/173 |
| 8,923,556 B2* | 12/2014 | Zhang | .................... | G06V 10/56 382/165 |
| 9,098,754 B1* | 8/2015 | Stout | ........................ | G06T 7/70 |
| 9,183,432 B2* | 11/2015 | Sasatani | .............. | G06V 40/103 |
| 9,251,410 B1* | 2/2016 | Lin | ...................... | G06V 40/173 |
| 9,495,600 B2* | 11/2016 | Heu | .......................... | G06T 7/20 |
| 9,927,951 B2* | 3/2018 | Gatter | .................. | G06F 16/285 |
| 10,108,867 B1* | 10/2018 | Vallespi-Gonzalez | ........................ | G06V 20/58 |
| 10,120,057 B1* | 11/2018 | Byrne | .................... | G01S 17/89 |
| 10,134,146 B2* | 11/2018 | Saleemi | ................ | G06T 11/206 |
| 10,677,905 B2* | 6/2020 | Baheti | .................... | G01S 7/415 |
| 10,775,482 B2* | 9/2020 | Santra | .................... | G01S 7/2883 |
| 10,884,131 B1* | 1/2021 | Allais | .................... | G06V 20/58 |
| 11,062,454 B1* | 7/2021 | Cohen | .................... | G06V 10/82 |
| 11,176,693 B1* | 11/2021 | Gonzalez-Nicolas | ........................ | G06V 10/82 |
| 11,585,891 B2* | 2/2023 | Santra | ..................... | G01S 7/417 |
| 2003/0179127 A1* | 9/2003 | Wienand | .................. | G07C 9/00 342/28 |
| 2004/0220769 A1 | 11/2004 | Rui et al. | | |
| 2006/0067456 A1* | 3/2006 | Ku | ............ | G07C 9/00 377/6 |
| 2007/0003141 A1* | 1/2007 | Rittscher | ................ | G06V 20/53 382/173 |
| 2013/0064425 A1* | 3/2013 | Sagawa | .................. | G06V 40/10 382/103 |
| 2013/0113647 A1* | 5/2013 | Sentelle | .................. | G01S 13/04 342/22 |
| 2013/0144565 A1 | 6/2013 | Miller et al. | | |
| 2015/0332463 A1* | 11/2015 | Galera | ..................... | H04N 7/18 382/103 |
| 2015/0369911 A1* | 12/2015 | Mabrouk | .............. | G01S 13/888 342/159 |
| 2017/0206669 A1* | 7/2017 | Saleemi | ................ | G06T 11/206 |
| 2017/0228602 A1* | 8/2017 | Stefanovic | ............ | G01B 11/14 |
| 2019/0088004 A1* | 3/2019 | Lucas | ..................... | G06T 19/20 |
| 2019/0096086 A1* | 3/2019 | Xu | ....................... | G01S 13/867 |
| 2019/0108740 A1* | 4/2019 | Coke | ...................... | G01S 7/415 |
| 2019/0108913 A1 | 4/2019 | Coke et al. | | |
| 2019/0145765 A1* | 5/2019 | Luo | ...................... | G06V 10/764 702/153 |
| 2019/0227156 A1* | 7/2019 | Santra | ..................... | G01S 13/42 |
| 2019/0273871 A1* | 9/2019 | Chen | ...................... | H04N 23/695 |
| 2019/0285752 A1* | 9/2019 | Chattopadhyay | ...... | G06V 20/58 |
| 2019/0310378 A1* | 10/2019 | Ho | ....................... | G01S 17/89 |
| 2020/0160487 A1* | 5/2020 | Kanzawa | ............. | G06V 10/267 |
| 2020/0196913 A1* | 6/2020 | Franz | ........................ | G06T 7/60 |
| 2020/0342250 A1* | 10/2020 | Smirnov | .................. | G06V 10/763 |
| 2021/0271895 A1* | 9/2021 | Chen | ........................ | G06T 7/50 |
| 2022/0005332 A1* | 1/2022 | Metzler | ............ | G08B 13/1968 |
| 2022/0101646 A1* | 3/2022 | McDonald | ........... | G06V 40/161 |

OTHER PUBLICATIONS

Peijun Zhao, et al., "mID: Tracking and Identifying People with Millimeter Wave Radar," 2019 15th International Conference on Distributed Computing in Sensor Systems (DCOSS), IEEE DOI 10.1109/DCOSS.2019.00028, May 29, 2019, XP033599299.

* cited by examiner

NON-CONTACT IDENTIFICATION OF MULTI-PERSON PRESENCE FOR ELDERLY CARE

CROSS-REFERENCE TO RELATED APPLICATIONS

This application claims priority to U.S. Prov. App. No. 62/882,899, filed on Aug. 5, 2019, and entitled "NON-CONTACT IDENTIFICATION OF MULTI-PERSON PRESENCE FOR ELDERLY CARE", which is incorporated herein by reference.

TECHNICAL FIELD

This application is directed to the field of remote monitoring of multi-person presence using interconnected hardware and software, and more particularly to remote identification of joint presence of two or more persons within a facility where an elderly person is residing using an ultra-wideband radar and machine learning.

BACKGROUND OF THE INVENTION

Quick aging of the world's population transforms family lifestyles, as well as the economy and structure of an elderly care. The global population aged 60 and more years has more than doubled in 2017 compared with 1980, reaching 962 million seniors; according to demographic forecasts, the global population of seniors is expected to double again by 2050 to approximately 2.1 billion. Within this trend, the number of persons aged 80 years or over will grow even faster and is expected to triple between 2017 and 2050 from 137 million to 425 million people. By 2030, older people (aged 60+ years) will outnumber children under the age of 10 and by 2050 older people will exceed the number of adolescents and youth aged 10-24 years (2.1 billion vs 2 billion). Japan, as an example, is already the oldest country in the world with 33.4 percent of the population aged 60 and more years. Japan is expected to retain this status for at least 30 years when the country's older people will account for 42.4 percent of population.

In view of these demographic trends and a well-known and reliable estimate that about 70 percent of individuals over age of 65 will require some type of long-term care services during their lifetime, long-term elderly care (LTC) has become a problem of national significance in many countries. Governments, businesses and non-profit organizations around the world are offering numerous long-term care options and insurance models. An important requirement for a long-term care system for aged individuals is permanent non-invasive monitoring of their condition to ensure a secure stay and satisfactory performance of daily activities of the individuals as well as an adequate performance of Activities of Daily Living (ADLs) and prevention of traumas in long-term care facilities. Video cameras and other invasive tracking methods don't suit privacy requirements of elder individuals, especially in places like bathrooms. Multiple non-invasive solutions utilizing Wi-Fi networks and compact radars have been recently proposed for the purpose of tracking elderly individuals and other audiences. Examples include the Tellus radar-based senior care system, the Radar Health Monitor, developed by Kyoto University in partnership with Panasonic, and an Aura Wi-Fi motion technology by Cognitive Systems Corporation.

Radars of advanced systems for monitoring elderly individuals, such as Tellus, capture point clouds of moving objects; point cloud density depends on the intensity of movement. Consequently, radar-based systems for elderly care may distinguish between dynamic (walking, exercising) and static (standing, sitting, lying in bed) states of individuals and may use such characterization for periodic measurements of individual vital signs, such as heart and breathing rates; capturing starts once a user is found in one of a number of possible desired states (for example, sitting or lying in bed for a sufficient amount of time to relax).

Notwithstanding the progress in identifying user states and measuring vital signs of users, accuracy and usability may be challenged by the presence of multiple persons in a room or other facility. For example, when a caregiver or a visitor closely interacts with a senior (a permanent occupant of the facility) and stays in proximity to the senior for a prolonged time, it may be difficult to differentiate between point clouds of two or more people present in the room. It would be desirable to exclude periods of time with multi-person presence in a facility from measurement schedules for user vital signs.

Accordingly, it is desirable to provide new techniques and systems for reliable identification of multi-person presence in a facility where condition and behavior of a user is monitored and vital signs of the user are measured.

SUMMARY OF THE INVENTION

According to the system described herein, detecting multiple people in a room includes detecting a point cloud corresponding to at least one user moving in the room, forming a bounding box corresponding to coordinates of points of the point cloud, and determining if the point cloud corresponds to multiple people based on a size of the point cloud, a presence of separate clusters of points in the point cloud, and/or detecting one or more people entering or leaving the room. Detecting a point cloud may include using a tracking device to capture movements of the user. The tracking device may use radar. The size of the point cloud may be compared with a size of a point cloud corresponding to a single user of the room. A presence of separate clusters of points in the point cloud may be detected following determining that the size of the point cloud is larger than the size of the point cloud corresponding to a single user of the room. Separate clusters of points may be determined using projection-based clustering or Delaunay triangulation. The projection-based clustering may include projecting horizontal coordinates of points of the point cloud upon a series of horizontal directions and choosing one or more horizontal directions where the projections of two or more subsets of points are distinct and possess a maximum average distance between the projections of the adjacent subsets. The Delaunay triangulation may be clustered based on cutting the graph of the Delaunay triangulation built for the top view of the point cloud into connected components according to lengths of the sides of triangles. A Kalman filter may be used to track movement of people in the room. The Kalman filter may use bounding rectangles of horizontal coordinates of separate clusters of points in the point cloud as representations of dynamic objects. Detecting one or more people entering or leaving the room may include previously detecting entrances of the room. Previously detecting entrances of the room may include tracking movement of people in the room and determining a location where movement results in more or less people in the room. An entrance may be detected when a person in the room is detected to be walking toward a boundary of the room and, subsequently, the person is no longer detected as being in the room. Detecting multiple people in a room may also include obtaining vital signs of a user in the room in response to there being only being a single person in the room. Vital signs of the user may be obtained at an end of a decision-making period in response to a single person being in the room during the decision-making period. The decision-making period may be one minute. The decision-making period may be subdivided into a plurality of discovery periods in which multiple people or a single person is detected in the room. For each of the discovery periods, a multi-person presence status may be set to yes, no, or uncertain according to the point cloud at different times during each of the discovery periods. The multi-person presence status of the decision-making period may be determined by aggregating the multi-person presence statuses of each of the discovery periods. The aggregation may use probabilistic reasoning.

According further to the system described herein, a non-transitory computer readable medium contains software that detects multiple people in a room. The software includes executable code that detects a point cloud corresponding to at least one user moving in the room, executable code that forms a bounding box corresponding to coordinates of points of the point cloud, and executable code that determines if the point cloud corresponds to multiple people based on a size of the point cloud, a presence of separate clusters of points in the point cloud, and/or detecting one or more people entering or leaving the room. Detecting a point cloud may include using a tracking device to capture movements of the user. The tracking device may use radar. The size of the point cloud may be compared with a size of a point cloud corresponding to a single user of the room. A presence of separate clusters of points in the point cloud may be detected following determining that the size of the point cloud is larger than the size of the point cloud corresponding to a single user of the room. Separate clusters of points may be determined using projection-based clustering or Delaunay triangulation. The projection-based clustering may include projecting horizontal coordinates of points of the point cloud upon a series of horizontal directions and choosing one or more horizontal directions where the projections of two or more subsets of points are distinct and possess a maximum average distance between the projections of the adjacent subsets. The Delaunay triangulation may be clustered based on cutting the graph of the Delaunay triangulation built for the top view of the point cloud into connected components according to lengths of the sides of triangles. A Kalman filter may be used to track movement of people in the room. The Kalman filter may use bounding rectangles of horizontal coordinates of separate clusters of points in the point cloud as representations of dynamic objects. Detecting one or more people entering or leaving the room may include previously detecting entrances of the room. Previously detecting entrances of the room may include tracking movement of people in the room and determining a location where movement results in more or less people in the room. An entrance may be detected when a person in the room is detected to be walking toward a boundary of the room and, subsequently, the person is no longer detected as being in the room. The software may also include executable code that obtains vital signs of a user in the room in response to there being only being a single person in the room. Vital signs of the user may be obtained at an end of a decision-making period in response to a single person being in the room during the decision-making period. The decision-making period may be one minute. The decision-making period may be subdivided into a plurality of discovery periods in which multiple people or a single person is detected in the room. For each of the discovery periods, a multi-person presence status may be set to yes, no, or uncertain according to the point cloud at different times during each of the discovery periods. The multi-person presence status of the decision-making period may be determined by aggregating the multi-person presence statuses of each of the discovery periods. The aggregation may use probabilistic reasoning.

The proposed system offers a continuous identification of multi-person presence in a facility based on geometric analysis, clustering and dynamic tracking of one or multiple point clouds, monitoring mutual states of multiple users, including uncertain states, and on a series of heuristics, such as statistics of walking speed of a user and location of entry/exit area(s) within the facility, where some of the heuristics may be trainable to continuously improve performance. Various aspects of system functioning and a process of identifying multi-person presence are explained as follows.

1. Radars, point clouds and frames. A tracking device constantly captures high precision data from moving objects in a room where a user resides. Movements include walking, exercising, etc.; movements with a smaller amplitude may include breathing and heartbeat present when people are standing, sitting, lying down on a bed or a floor, etc. The device may include one or multiple radars or other non-camera based motion capturing technologies. Captured data is presented in the form of point clouds, showing three-dimensional coordinates of moving points, frame by frame, delivering several frames per second for user tracking purposes.

2. Individual states. User states for the purpose of the system described herein may include: W—walking, St—standing, S—sitting, L—lying down, Sl—deep sleep when the radar does not product point clouds because of very low movement amplitudes and frequencies, D—departed (absent from the facility). States of any other person (non-user) present in the facility may be the same, except the deep sleep state is very unlikely, since a person other than the user does not live or rest in the facility; lying down may also be relatively less probable for a non-user.

3. Mutual states. In situations with multi-person presence, a mutual state is an n-tuple, where n is the number of persons in the facility and each n-tuple lists the states of all persons identified within a particular frame (except for state uncertainties explained below). Thus, for the case of two persons, the first of whom may be a user and the second one a caregiver or a visitor (i.e., a non-user), an n-tuple is a couple of states and the set of mutual states may include any feasible combination <user state, non-user state>, such as WW—both persons are walking, StW—the user is standing and the caregiver (non-user) is walking, LS—the user is lying down and the caregiver is sitting, etc.

4. Uncertain mutual states. The system may include uncertain mutual states in situations where there may be indications of multi-person presence, but the system may not be able to make a firm determination of multi-person presence and/or of mutual states based solely on a combined point cloud. For example, if a user had approached a facility door and stopped to meet a caregiver and the caregiver had just entered the room and is standing close to the user (perhaps, shaking hands with the user), then the system may have difficulty detecting the multi-person presence based solely on point clouds of two static persons. Analogously, if a user in a wheelchair is assisted by a caregiver through the facility, the corresponding point clouds may be positioned too close to detect multi-person presence. Therefore, the system may include two (or more) uncertain multi-person presence states: MU for the Mobile Uncertain, similar to the wheelchair scenario, and IU for the Immobile (static) Uncertain, analogous to the handshake scenario.

5. System dynamics. Dynamic behavior of individuals tracked by the system may be represented by a frame-by-frame sequence of individual and mutual states reflecting a situation within a facility. An example of such sequence is shown below:

$$S/t_1 \to St/t_2 \to W/t_3 \to StW/t_4 \to IU/t_5 \to WW/t_6,$$

describing the following situation: a user is sitting in a room (frame $t_1$), then stands up ($t_2$), comes to the door ($t_3$) to meet a caregiver (non-user) and stands at the door when the caregiver walks in ($t_4$) and the user and caregiver stand at the door close to each other, perhaps shaking hands, which creates a static uncertain situation ($t_5$) (it is possible that the two are standing at the door, but maybe the caregiver has left the room), then the user and caregiver both walk into the room at a sufficient distance from each other, which allows the system to reliably detect multi-person presence and mutual state ($t_6$).

6. Decision-making period. A decision-making period and time unit are designated to determine whether it is feasible for the system to start measuring, at the end of such period, vital signs of a user. The length of a decision-making time unit may be, for example, one minute. This means that, at the end of each one-minute interval, a decision is made whether to start measuring vital signs of the user. If multi-person presence has been detected within a decision-making period, then the answer may be negative and vital sign measurements will not start immediately. If presence of the user alone has been detected within a decision-making period, then the answer may depend on other factors, such as a static and relaxed position of the user. Measurement of vital signs using the system and the components described here is described, for example, in published PCT patent application WO/2019/070651 (PCT/US2018/053884) and its counterpart, U.S. patent application Ser. No. 16/149,422, filed on Oct. 2, 2018 titled: "VITAL SIGNS WITH NON-CONTACT ACTIVITY SENSING NETWORK FOR ELDERLY CARE", which is incorporated by reference herein.

7. Discovery period. A discovery period and time unit are a smaller time interval and duration for checking immediate object state(s) in the facility and determining whether there is one or multiple people in the facility within a duration of the smaller time interval or whether the answer is uncertain (i.e. determining the multi-person presence status for a given discovery period). As an example, if the system produces four frames per second, a discovery period may contain 20-40 frames and the time unit may be 5-10 sec. long. The length of the discovery period may be correlated with the accuracy of capturing of moving objects by system radar(s) and an average density or quantity of points in point clouds representing individuals in the facility, including users and non-users such as caregivers, visitors, etc.

Upon completion of all discovery periods within a decision-making period, the system may assess the multi-person presence status for the decision-making period by aggregating the multi-person presence statuses for the discovery periods. Such assessment may be based on deterministic of probabilistic reasoning; for example:

a. If one or more of the discovery periods within a decision-making period may be with certainty marked as the periods with multi-person presence, then the decision-making period is also a multi-person presence period.

b. If all discovery periods within a decision-making period are reliably characterized as the single-person presence periods, then the decision-making period is also identified as a single-person presence timeframe.

c. If some of the discovery periods are marked as periods with an uncertain multi-person presence and the rest are single-person discovery periods, then, in certain cases, a probability of single-person presence may be associated with each uncertain discovery period, and the decision on the single-person presence of the decision-making period may be obtained by probabilistic reasoning, for example, by accepting the probabilistic hypothesis of the single-person presence based on the condition of probability of all uncertain periods simultaneously being single-person presence periods exceeding a given threshold.

8. Collecting size and movement stats for user point clouds. For the most part, a user may stay alone in a facility for prolonged periods of time; if the user is under a permanent care with a caregiver present, there is a limited need in an autonomous user tracking. Thus, the system has enough time to build a geometric profile of point clouds of the user in various states, such as size distribution of dimensions of a bounding box of the point cloud and user speed profile (see below on a particular speed assessment method). Parameters of a user profile may enable several efficient heuristics for identifying multi-person presence.

9. Mutual bounding box. A current state of a user or any person present in a facility may be identified by analyzing a bounding box of a point cloud built by the radar, including the size, orientation of dimensions, and relative point density in the point cloud. When multiple persons (such as a user and a caregiver) are located in a facility, each person generates a separate point cloud, each of which has a separate bounding box. However, before multi-person presence has been identified and related geometry of point clouds has been analyzed and processed, the system may not be aware of the situation. Therefore, building a bounding box of the point cloud delivered by the tracking device for the current frame may become the first step in detecting multi-person presence. If a user alone is present in a facility, then parameters of bounding boxes of point clouds for different user states would be similar to previously collected data, as explained in #8 above. However, if there are two or more people, the mutual bounding box (the bounding box of combined point clouds of multiple people) could be significantly larger than the individual bounding box for a user, especially if multiple people are located at a significant distance from each other. Even if multiple people are located close to each other, the mutual bounding box may still be expected to differ from a bounding box of only the user. Thus, dimensions of the mutual bounding box of a point cloud captured for a particular frame may serve as a first heuristics for identifying multi-person presence. The dimensions may also be used to detect the presence of a single person different from the user (see examples above).

10. Clustering point clouds. Once the system has detected a mutual bounding box that is significantly different (e.g., larger) from a bounding box of a single user, the system may attempt to identify each individual point cloud for subsequent processing. This may be accomplished through clustering of the combined point cloud and may use a variety of known mechanisms; two of which are explained in details below:

a. A version of projection-based clustering may utilize a batch of vertical planes drawn under different angles to standard coordinates. The combined point cloud is orthogonally projected on each plane, associated with a horizontal axis of the combined point cloud, and reliable clusters of points are identified in one-dimensional projections. The vertical plane that delivers the best clustering quality (the most distinct clusters) defines the clusters. Projection-based clustering is equivalent to finding two (or more) parallel vertical planes separating the point cloud so that there are no points between the planes. In one example of measuring the clustering quality, the projection-based clustering method is equivalent to projecting horizontal coordinates of points of the point cloud (obtained from the top view of the point cloud) upon a series of horizontal directions (axes) and choosing one or more horizontal directions where the projections of two or more subsets of points are distinct and possess a maximum average distance between the projections of the adjacent subsets. Projection-based clustering may work best for a two-person presence.

b. A clustering method based on Delaunay triangulation first builds a top view of a combined point cloud (an X-Y projection onto the horizontal plane). Next, a Delaunay triangulation is built for a set of points on the plane and the lengths of triangle sides are assessed, grouped and a threshold is chosen for cutting the triangulation graph into parts, so that all sides longer than the threshold are eliminated and connected components of the truncated graph are built. If the result is several connected components, the components form the clusters of the combined point cloud. Delaunay triangulation may be iterated to check the stability of clustering depending on the cutting threshold.

c. Other clustering mechanisms, such as K-means, Mean-Shift or DBSCAN clustering algorithms, may also be used to identify subsets of points of the combined point cloud, indicating the multi-person presence.

If a mutual bounding box is noticeably different from a bounding box for a single person, but neither clustering method delivers a satisfactory clustering, it could indicate that two or more persons in the room are located too close to each other and may even be touching each other as in the foregoing examples of a handshake or a caregiver pushing a wheelchair with a user. In this case, the multi-person presence may still be assigned to a frame but a mutual state may be declared uncertain (IU or MU, depending on whether the persons are static or moving).

11. Movement tracking. The system may track moving person(s) (users and non-users) within a facility utilizing various tracking methods, such as Kalman filters. For example, in a scenario where a clustering step has analyzed point clouds for a sequence of adjacent frames to identify two people walking, the system may use a bounding rectangle of the top view of the point cloud for each person as a representation of a dynamic object and use, as an example, the coordinates of a top left and bottom right corner of each bounding rectangle and a velocity of the top left corner as parameters of a Kalman filter. The filter predicts object parameters for a next frame and uses actual coordinate values (measurements) to adjust the filter for a particular object:

$$(a_n^p, b_n^p, \dot{a}_n^p), (a_n^m, b_n^m) \rightarrow_{K_F} (a_{n+1}^p, b_{n+1}^p, \dot{a}_{n+1}^p),$$

where (a, b) are coordinates of corners of a bounding rectangle, à—velocity, n, n+1—adjacent frame numbers, p—parametric (predictive) component of the Kalman filter, m—measurement related component of the Kalman filter $K_F$.

Precise tracking of object movements has many benefits: it may allow estimating user walking speed at various times and in conjunction with various user behaviors, may help assess moments and locations within a facility when different persons enter and leave facility, etc.

12. Identifying and using entry/exit areas. A newly installed mass-market, out-of-the-box tracking device may not be aware of facility geometry and may not require a calibration or a special setup to input such geometry into the system. The tracking device may learn room geometry and location of various furniture items on-the-fly by analyzing user behavior. This relates, in particular, to location of entry/exit door(s) in the facility. The location of main entry-exit door(s) may be associated with events of reliable identification of changes between single-person and multi-person presence. For example:

a. If a user has been alone in a room (single-person state) within a period of time, and the next few frames reliably identify a multi-person presence with another person moving across the room, then the center of a point cloud for the other person for the first frame where the multi-person presence has been identified is likely located near the room entrance.

b. Similarly, if a multi-person presence in a room has been identified within a series of frames, and two conditions are satisfied: (i) one or more of the identified persons are walking across the room, (ii) the multi-person presence is changed to a single-person presence, where the walking person(s) of the condition (i) are no longer detected in the room, then the location of point cloud(s) for the walking person(s) within the last frame when the multi-person presence was detected should be near the room entrance.

Repetitive observations of reliable changes a.-b. may lead to a reliable geometric location of entry/exit area(s) of the facility, which may be subsequently used as an efficient heuristic for identifying multi-person presence and the changes between single-person and multi-person presence by tracking arriving or leaving walking person(s) at the entry/exit points.

With the foregoing definitions and mechanisms in mind, an outline for identifying multi-person presence may include the following aggregate steps:

A. A decision-making period (such as a one-minute timeframe) within a longer observation period is chosen and split into smaller discovery periods, which may form a sliding scale with a predetermined shift from one discovery period to the next.

B. Frames of a current discovery period are chosen one-by-one and a point cloud of moving objects in a facility is delivered by the tracking device.

C. An initial stage of detection of multi-person presence may start with building a mutual bounding box of the point cloud and comparing parameters of the bounding box with previously established parameters of a bounding box of a user. A significant difference provides preliminary evidence of multi-person presence, which may be verified by reaffirming mutual bounding box heuristics for several subsequent frames of a discovery period.

D. If there is enough preliminary evidence of multi-person presence based on mutual bounding boxes, the system may proceed with clustering a corresponding combined point cloud. In case of success, the system may define objects for dynamic tracking and provide such tracking for moving (walking) user states, which would allow continuous measurement of user speed and updating a user speed profile, help define entry/exit areas and, when such areas are defined and used as additional heuristics, identify times when a person enters and leaves the room.

E. Using clustering, tracking and other heuristics explained herein, along with a continuous process of identifying a state of each person, system dynamics is captured and periods of multi-person presence are identified, enabling positive or negative decision on measuring vital signs of a user at the end of each decision-making period.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a continuous identification of multi-person presence in a facility based on geometric analysis, clustering and dynamic tracking of one or multiple point clouds, and monitoring mutual states of multiple users, including uncertain states.

Figure 1:
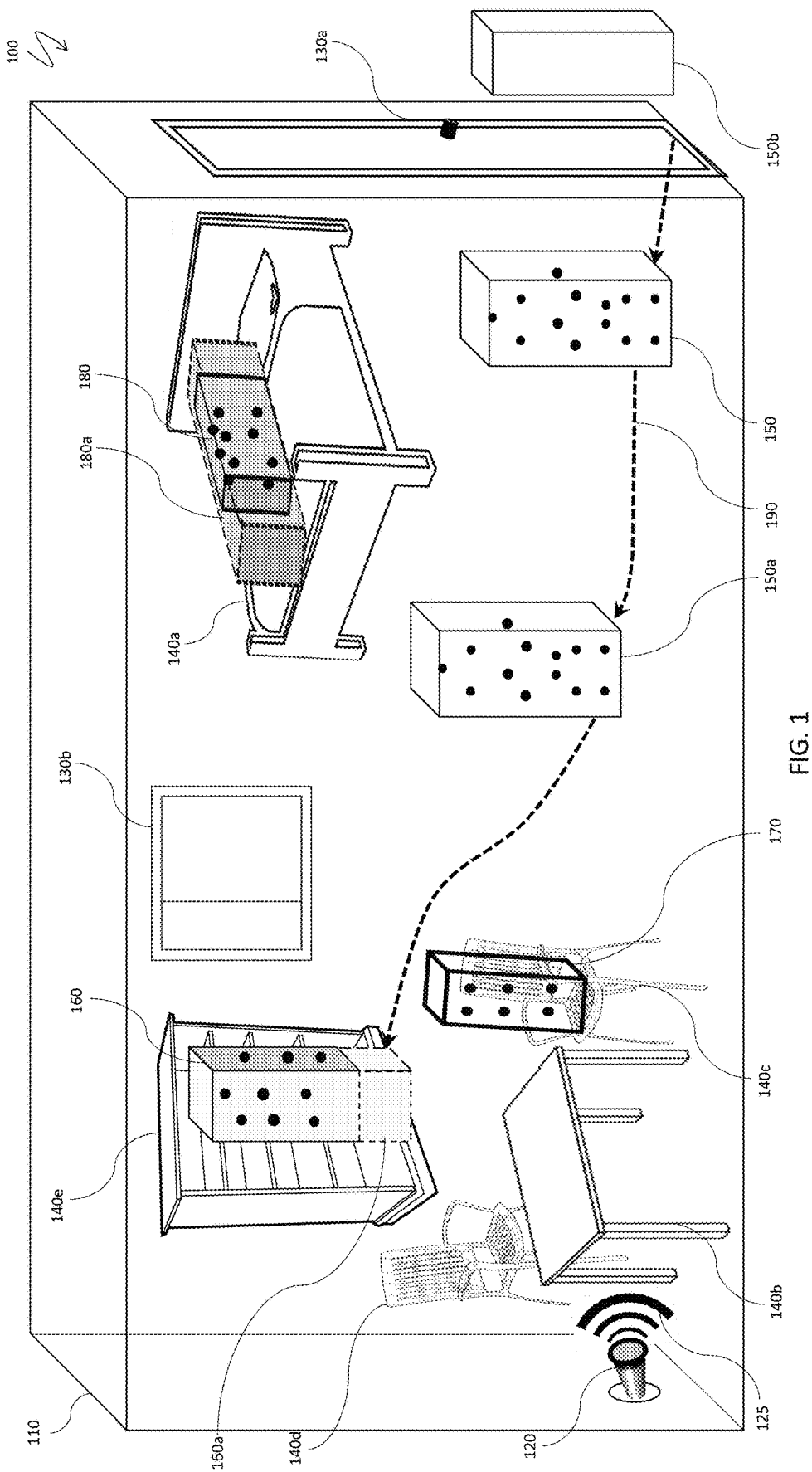
FIG. 1 is a schematic illustration of a furnished room with a non-contact tracking device and point clouds for different user states, according to an embodiment of the system described herein.

FIG. 1 is a schematic illustration 100 of a furnished room with a non-contact tracking device and point clouds for different user states. A room 110 with a non-contact tracking device 120 emitting a radar signal 125 has a door 130a, a window 130b and is furnished with a bed 140a, a table 140b, a couple of chairs 140c, 140d and a bookcase 140e. A user starts from an outside position 150b, enters the room 110 and walks across the room 110 along a path 190 to the bookcase 140e. The tracking device 120 captures user movement, generating a sequence of point clouds 150, 150a, 160. Note the absence of points captured by the tracking device 120 in the cuboid 160a because of a static standing position of the user. An additional point cloud 170 corresponds to a sitting state where the user is sitting on the chair 140c. A point cloud 180 corresponds to a lying down state where the user is lying down on the bed 140a. Similar to the cuboid 160a, the cuboid 180a does not generate points in the point cloud 180 because of the static position of the user on the bed 140a: only the chest and stomach movements of the user due to breathing and heartbeat are registered by the tracking device 120.

Figure 2:
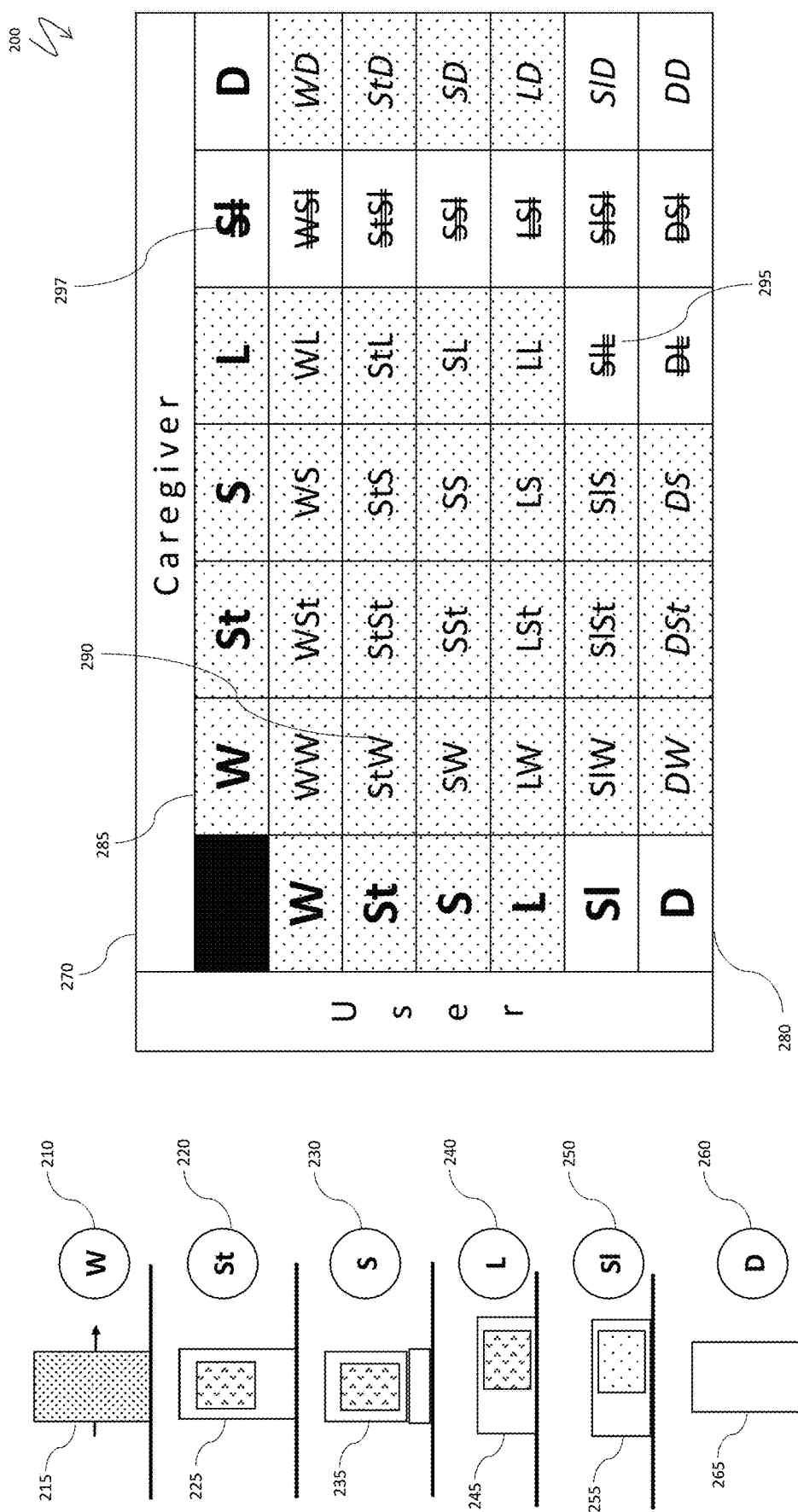
FIG. 2 is a schematic illustration of user and caregiver states and a corresponding mutual state matrix, according to an embodiment of the system described herein.

FIG. 2 is a schematic illustration 200 of user and caregiver states and a mutual state matrix 270. A plurality of point clouds 215, 225, 235, 245, 255, 265 on the left illustrate specifics of user states as follows: (i) a walking state 210 is represented by the cloud point 215 with high point density spread over the whole user/caregiver height; (ii) a standing state 220 and a sitting state 230 correspond to the point clouds 225, 235, which are geometrically similar, where the points are mostly generated by breathing and heartbeat of the user, while the relatively static head and legs do not contribute to the point cloud (the difference in the point clouds 225, 235 is in relative vertical positions of bounding boxes of the point clouds); (iii) analogously, two adjacent states of lying down 240 and sleeping 250 are represented by the point clouds 245, 255, respectively, where only breathing and heartbeat produce sufficient numbers of points in the point clouds, albeit point density for the lying down state is higher than in the sleeping state due to more intensive breathing and higher heart rate; (iv) finally, a departed state 260 where a user or a caregiver is out of the room does not produce a point cloud, as illustrated by the empty point cloud 265.

The mutual state matrix 270 includes feasible combinations of states of a user (such as a senior resident of a long-term care facility) and a non-user, such as a caregiver. The matrix illustrates combinations used to detect a multi-person presence. A column 280 includes user states, a row 285 lists caregiver states and a plurality of cells 290 of the matrix 270 show combinations of states. Not all combined states are feasible: for example, a combined state 295, where the user is sleeping and a caregiver is lying down is a highly unlikely combination; any combined states associated with a column 297 where a caregiver (non-user) is sleeping in a room of the user are also impractical.

Figure 3:
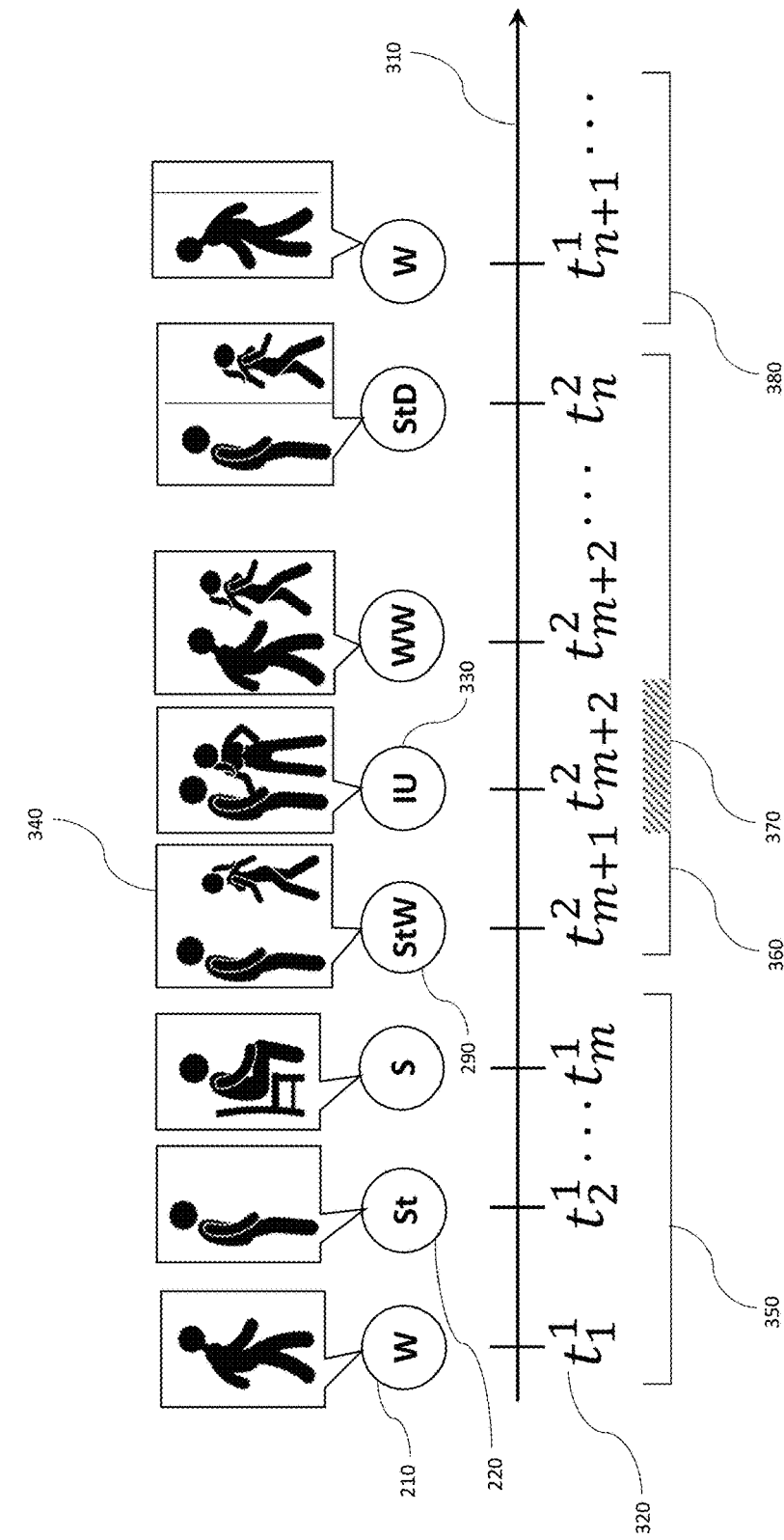
FIG. 3 is a schematic illustration of a state timeline for single-person and multi-person presence, according to an embodiment of the system described herein.

FIG. 3 is a schematic illustration 300 of a state timeline 310 for single-person and multi-person presence. The timeline 310 has multiple timestamps 320, corresponding to identified user states, such as the single presence user states 210, 220, the multi-person presence (mutual) user states 290 and uncertain user states 330; pictograms 340 clarify user states for each time period 320. The timeline 310 is split into three portions: (a) the period of single presence 350, (b) the period of multi-person presence 360 with a sub-period of uncertain mutual state 370, and (c) the second single presence period 380.

Figure 4:
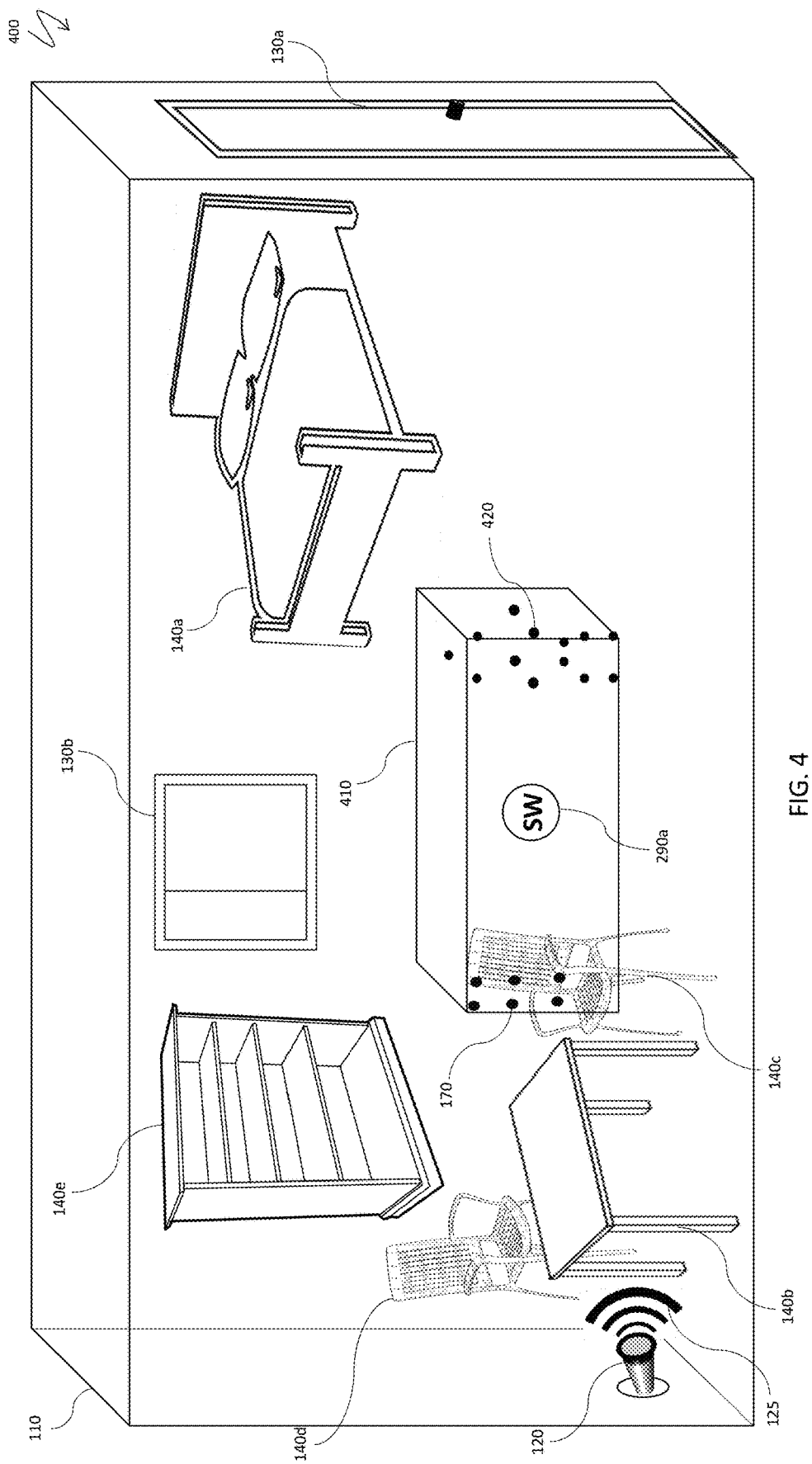
FIG. 4 is a schematic illustration of a mutual bounding box of point clouds for detecting multi-person presence, according to an embodiment of the system described herein.

FIG. 4 is a schematic illustration 400 of a mutual bounding box of point clouds for detecting multi-person presence. FIG. 4 uses the room 110 (same as in FIG. 1) with the non-contact tracking device 120 emitting the radar signal 125, the door 130a, the window 130b, furnished with the bed 140a, the table 140b, the chairs 140c, 140d and the bookcase 140e. A user is sitting on the chair 140c and the point cloud 170 is generated by the tracking device 120. At the same time, a caregiver (non-user) walks toward the user, generating a point cloud 420. A mutual state 290a of the user and the caregiver is shown. A mutual bounding box 410 is defined as the smallest cuboid containing both of the point clouds 170, 420. If the mutual bounding box 410 is large enough and is unlikely to be generated by a single user, the mutual bounding box 410 may be used as a heuristic rule to instantly detect a multi-person presence scenario.

Figure 5:
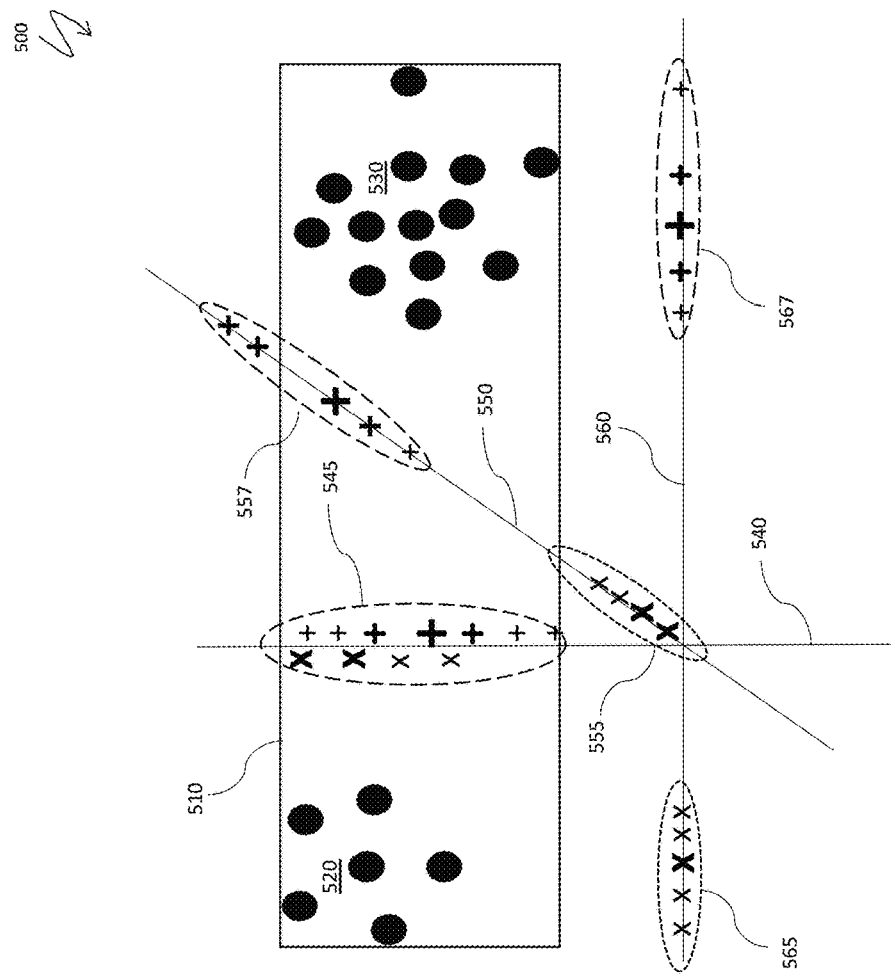
FIG. 5 is a schematic illustration of a projection-based clustering of point clouds, according to an embodiment of the system described herein.
Figure 5:
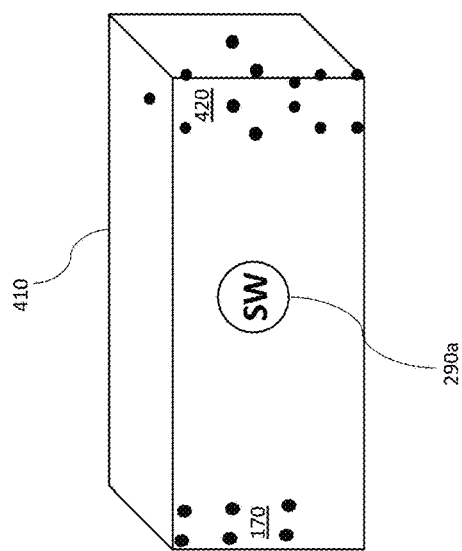

FIG. 5 is a schematic illustration 500 of a projection-based clustering of point clouds. The mutual bounding box 410 for the point clouds 170, 420 with a mutual state 290a is discussed above in connection with FIG. 4. Because the tracking device 120 (see in FIG. 1 and the accompanying text) generates all points of a combined point cloud simultaneously and a heuristic rule for detecting multi-person presence based on dimensions of a mutual bounding box may not detect multi-person presence, the system may use a different mechanism. For example, the system may generate a vertical projection of the point clouds 170, 420 upon a horizontal two-dimensional bounding box 510, where vertical projections 520, 530 of the point clouds 170, 420 (which are three-dimensional) are contained. The projections 520, 530 are initially treated as a single projection of an undivided point cloud (which is actually the two point clouds 170, 420). Subsequently, the system may create a plurality of separating lines 540, 550, 560 at different angles to the coordinate grid and different distances from the coordinate origins, and attempt to use the lines 540, 550, 560 to separate the combined point cloud into two or more distinct clusters. To this end, the system may project points of the combined point clouds onto each line. Points projected from different sides of the line form two different point distributions along each line, shown inside ovals 545, 555, 557, 565, 567, where points projected from one side of each line (the upper/left semi-plane) are marked by × signs and points projected from another side of each line (the lower/right semi-plane) are marked by + signs; size and boldness of the × and + signs in each distribution illustrate the density of point projections. Some of the separating lines may not cluster point projections from different semi-planes, i.e. from two sides of the line; and example of such non-clustering is a mixed distribution in the oval 545 provided by the line 540: the two sets of point projections occupy strongly intersecting intervals on the line. In contrast, the separating lines 550, 560 provide meaningful clustering of the point cloud, represented by the clusters 555, 557, 565, 567. The quality of clustering by a given separating line may be calculated as the distance between clusters, which makes the separating line 560 an optimal clustering solution. The presence of strong clustering of the point cloud is other evidence (and heuristic rule) indicating the multi-person presence.

Figure 6:
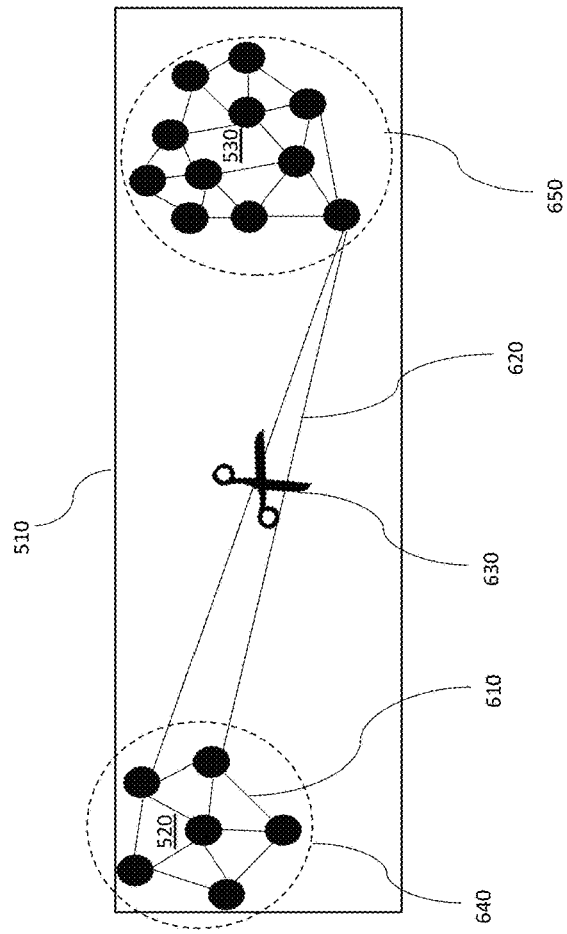
FIG. 6 is a schematic illustration of clustering of point clouds based on Delaunay triangulation, according to an embodiment of the system described herein.
Figure 6:
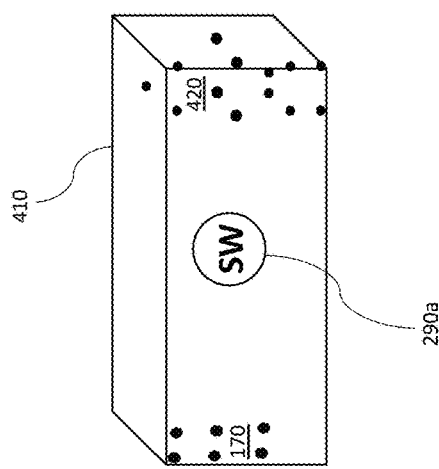

FIG. 6 is a schematic illustration 600 of clustering of point clouds based on the Delaunay triangulation. Analogously with FIG. 5, the mutual bounding box 410 for the point clouds 170, 420 corresponds to the mutual state 290a. Since the tracking device 120 generates all points of the combined point cloud simultaneously and the heuristic rules for detecting multi-person presence based on the mutual bounding box or projection-based clustering may not detect the multi-person presence (see FIGS. 4, 5 for details), the system may use yet another mechanism. Similar to FIG. 5, Delaunay triangulation is based on a vertical projection of the point clouds upon the horizontal two-dimensional bounding box 510, where the vertical projections 520, 530 of the three-dimensional point clouds 170, 420 are contained and are initially treated as a single projection of an undivided point cloud. Subsequently, a Delaunay triangulation graph 610 for the projections 520, 530 may be constructed, and geometrical lengths 620 may be assessed based on a distance between two points (vertices) of the projections 520, 530 connected by a particular edge. If the Delaunay triangulation graph has long edges, significantly exceeding an average edge length, the system may attempt cutting the graph into parts by eliminating such edges, as illustrated by a cutting operation 630. Subsequently, the system may verify whether the subgraph with eliminated long edges has two or more connected components, and if so, such components may become candidates for point clusters 640, 650, indicating multi-person presence, subject to checking a distance between the clusters (for example, the minimal distance between all pairs of points belonging to different clusters).

Figure 7:
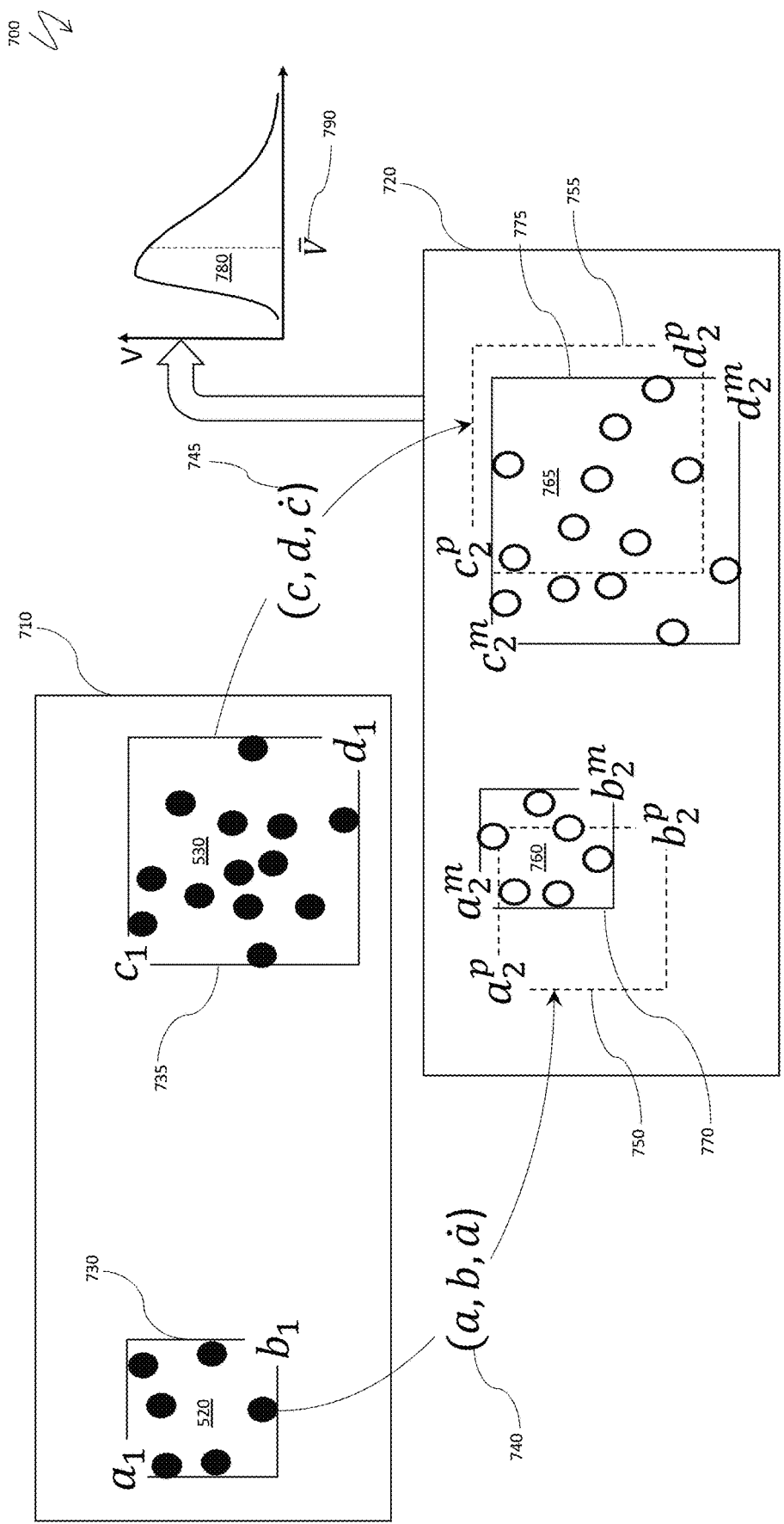
FIG. 7 is a schematic illustration of the movement tracking using Kalman filters, according to an embodiment of the system described herein.

FIG. 7 is a schematic illustration 700 of movement tracking using Kalman filters. Two adjacent frames 710, 720 include vertical projections onto a horizontal plane of point clouds of two previously identified objects (two persons in a room). Object are identified by corresponding bounding boxes 730, 735, which define parameters 740, 745 of the Kalman filter as the coordinates of the upper left and the lower right corner of each bounding box and the speed of the upper left corner (items with the dot accent). As the session progresses, the Kalman filter predicts new parameter values 750, 755 of the bounding boxes (dashed rectangles; parameters with the superscript p). Factual measurements 760, 765 conducted by the non-contact tracking device 120 define two bounding boxes 770, 775 (solid rectangles; parameters with the superscript m) that are used to adjust the Kalman filter for subsequent use. Because momentary object speed is one of the parameters of the Kalman filter, the system may build a distribution 780 of user walking speed and assess an average user walking speed 790.

Figure 8:
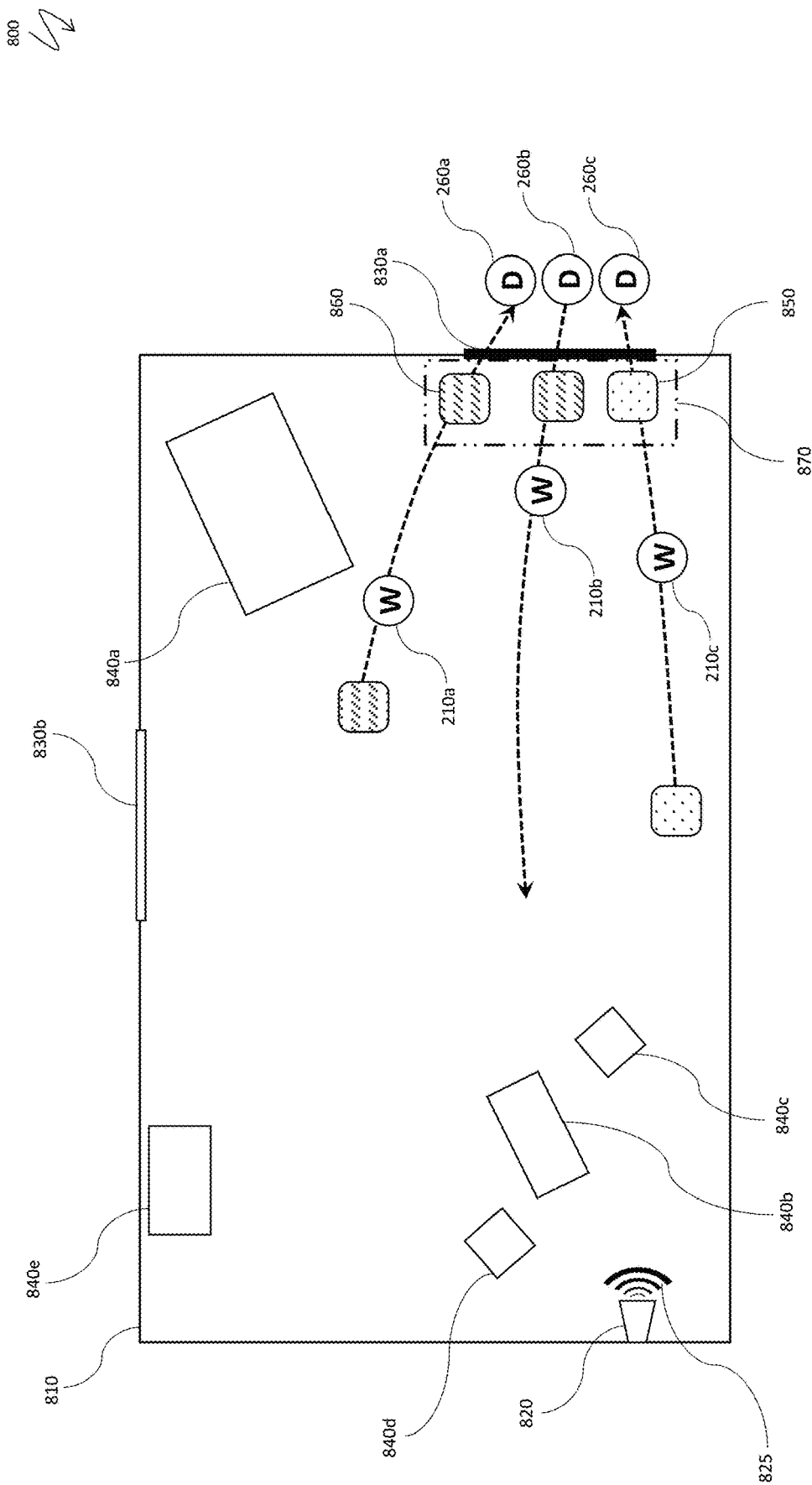
FIG. 8 is a schematic illustration of identifying entry/exit areas within a facility, according to an embodiment of the system described herein.

FIG. 8 is a schematic illustration 800 of identifying entry/exit areas within a facility. A plan (top view) of a room 810 with a non-contact tracking device 820, emitting a radar or other wireless signal 825 includes a door 830a and a window 830b. The room is furnished with a bed 840a, a table 840b, a pair of chairs 840c, 840d and a bookcase 840e. Whenever a user 850 or a caregiver 860 (non-user) enter or exit the room 810, which is shown by walking states 210a, 210b, 210c and departing states 260a, 260b, 260c (see FIG. 2 for notations associated with user states), the system may detect moments (frames) immediately after entering the room 810 (the first several frames when a new point cloud has been captured by the tracking device 820) or immediately before exiting the room (the last several frames captured for a previously tracked point cloud). Coordinates of such right-after-entry and right-before-exit point clouds determine an entry/exit area 870, which is helpful for subsequent detection of multi-person presence and transitions between multi- and single-person presence timeframes.

Figure 9:
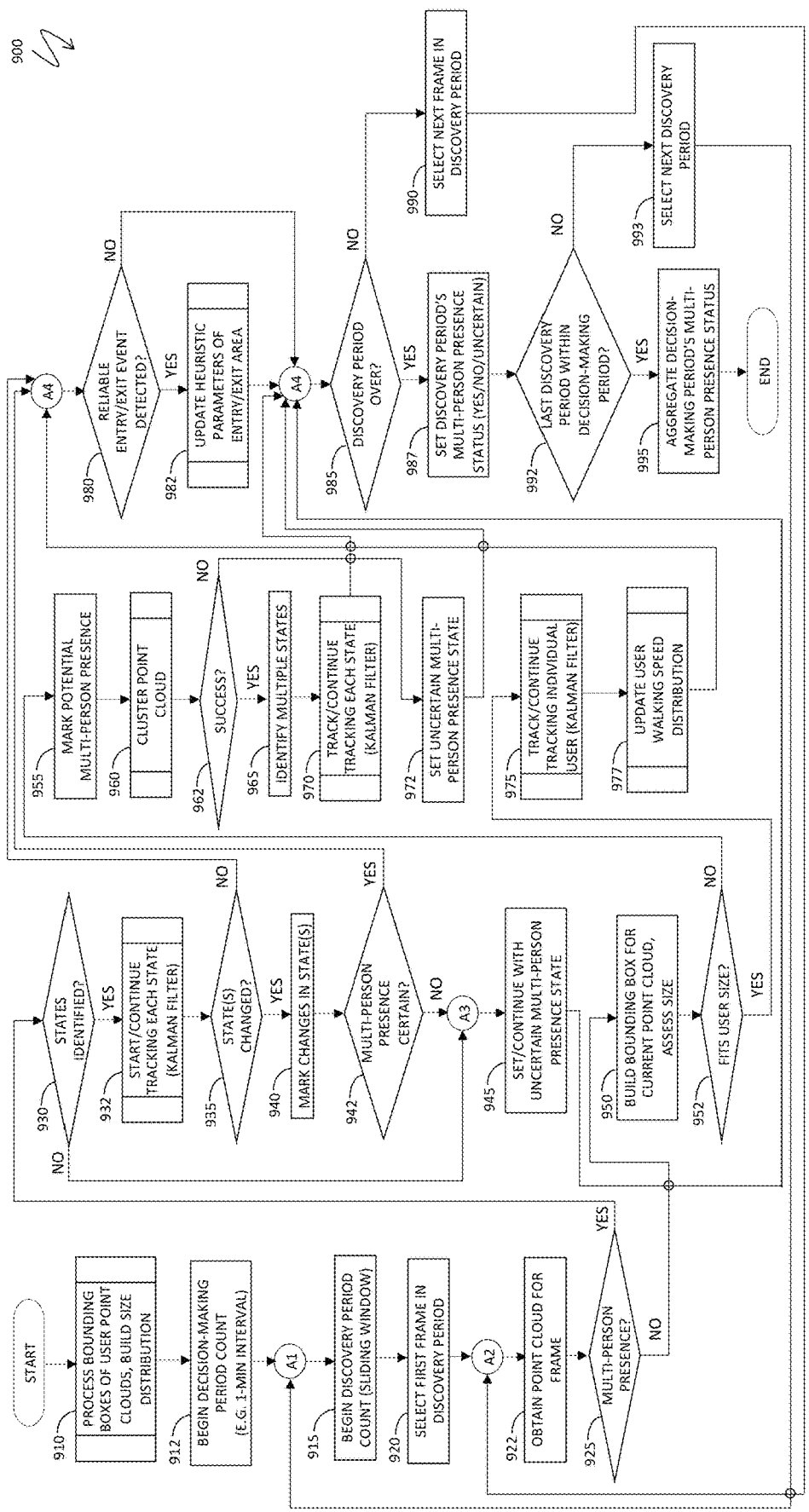
FIG. 9 is a system flow diagram illustrating system functioning in connection with detecting and monitoring multi-person presence, according to an embodiment of the system described herein.

Referring to FIG. 9, a system flow diagram 900 illustrates system functioning in connection with detecting and monitoring multi-person presence. Processing begins at a step 910, where a non-contact device generates user point clouds and the system constructs and processes bounding boxes of the point clouds and builds their size distribution for the purpose of user identification in the future sessions. After the step 910, processing proceeds to a step 912, where a count of a decision-making period begins, as explained elsewhere herein (see, for example, item 6 in the Summary of Invention section). After the step 912, processing proceeds to a step 915, where the count of a discovery period begins (see item 7 in the Summary section). After the step 915, processing proceeds to a step 920, where a first frame of the discovery period is selected. After the step 915, processing proceeds to a step 920, where a first frame in the discovery period is selected. After the step 920, processing proceeds to a step 922, where the point cloud for the current frame is obtained.

After the step 922, processing proceeds to a test step 925, where it is determined whether the multi-person presence was instantly detected. If so, processing proceeds to a test step 930, where it is determined whether each person's state in the multi-person group is identified. If so, processing proceeds to a step 932, where the system starts or continues tracking of each object state using Kalman filters or other mechanisms, as explained elsewhere herein (see FIG. 7 and the accompanying text for details of tracking using Kalman filters). After the step 932, processing proceeds to a test step 935, where it is determined whether one or more states of person(s) have changed compared with a previous frame. If so, processing proceeds to a step 940, where changes in state(s) are marked. After the step 940, processing proceeds to a test step 942, where it is determined whether the multi-person presence still remains certain. If not, processing proceeds to a step 945, where a multi-person presence state is set to (or remains) uncertain. Note that the step 945 may be independently reached from the test step 930, if it is determined that not all personal states have been identified for multi-person presence. After the step 945, processing proceeds to a test step 985, where it is determined whether the discovery period is over. If not, processing proceeds to a step 990, where a next frame of the discovery period is selected. After the step 990, processing proceeds back to the step 922, discussed above, which may be independently reached from the step 920. If it is determined at the test step 985 that the discovery period is over, processing proceeds to a step 987, where the multi-person presence status for the just finished discovery period is set to one of the Yes/No/Uncertain values, discussed elsewhere herein. After the step 987, processing proceeds to a test step 992, where it is determined whether the just finished discovery period is the last discovery period within the decision-making period. If so, processing proceeds to a step 995, where the multi-person presence status for the decision-making period is aggregated from multi-person presence statuses of the discovery periods, as explained elsewhere herein. After the step 995, processing is complete.

If it is determined at the test step 992 that the discovery period is not the last one, processing proceeds to a step 993, where the next discovery period is selected. After the step 993, processing proceeds to the step 915, which may be independently reached from the step 912.

If it is determined at the test step 942 that the multi-person presence is certain, processing proceeds to a test step 980, where it is determined whether a reliable entry/exit event is detected, as explained elsewhere herein (see FIG. 8 and the accompanying text for details). If not, processing proceeds to the test step 985, discussed above, which may be independently reached from the step 945; otherwise, processing proceeds to a step 982, where heuristic parameters of the entry/exit area are updated, as explained in connection with FIG. 8. After the step 982, processing proceeds to the test step 985, discussed above, which may be independently reached from the step 945 and the test step 980.

If it is determined at the test step 935 that no personal states have changed from the previous frame, processing proceeds to the test step 980, discussed above, which may be independently reached from the test step 942.

If it is determined at the test step 925 that the multi-person presence is not instantly determined, processing proceeds to a step 950, where the system builds a bounding box for the current point cloud and assesses a size of the bounding box. After the step 950, processing proceeds to a test step 952, where it is determined whether the bounding box corresponds to the size of the user (see the step 910 where the size distribution of user bounding boxes is built). If not, processing proceeds to a step 955, where the system marks potential multi-person presence. After the step 955, processing proceeds to a step 960, where an attempt to cluster the current point cloud is made, as explained elsewhere herein (the system may use Delaunay triangulation explained in connection with FIG. 6, K-means, Mean-Shift, DBSCAN and other clustering algorithms). After the step 960, processing proceeds to a test step 962, where it is determined whether the clustering attempt succeeded. If so, processing proceeds to a step 965, where the system identifies multiple states for objects (persons) defined by clusters. After the step 965, processing proceeds to a step 970, where the system tracks or continues tracking each state using Kalman filters or other mechanisms. After the step 970, processing proceeds to the test step 985, discussed above, which may be independently reached from the steps 945, 982 and from the test step 980.

If it is determined at the test step 962 that clustering of the point cloud did not succeed, processing proceeds to a step 972 where the uncertain multi-presence state is set. After the step 972, processing proceeds to the test step 985, discussed above, which may be independently reached from the steps 945, 970, 982 and from the test step 980.

If it is determined at the test step 952 that the bounding box of the current point clouds corresponds to the size of the user, processing proceeds to a step 975, where tracking of the individual user starts or continues, using Kalman filter or other mechanisms. After the step 975, processing proceeds to a step 977, where the user walking speed distribution is updated. After the step 977, processing proceeds to the test step 980, discussed above, which may be independently reached from the test steps 935, 942.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functions may vary from the illustrations presented herein. Further, various aspects of the system described herein may be implemented using various applications and may be deployed on various devices, including, but not limited to smartphones, tablets and other mobile computers. Smartphones and tablets may use operating system(s) selected from the group consisting of: iOS, Android OS, Windows Phone OS, Blackberry OS and mobile versions of Linux OS.

Mobile computers and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of detecting multiple people in a room, comprising:
   detecting a point cloud corresponding to at least one user moving in the room;
   forming a bounding box corresponding to coordinates of points of the point cloud;
   determining if the point cloud corresponds to multiple people based on at least one of:
   a size of the point cloud, a presence of separate clusters of points in the point cloud, or detecting one or more people entering or leaving the room; and
   obtaining vital signs of a user in the room in response to there being only being a single person in the room.

2. A method, according to claim 1, wherein vital signs of the user are obtained at an end of a decision-making period in response to a single person being in the room during the decision-making period.

3. A method, according to claim 2, wherein the decision-making period is one minute.

4. A method, according to claim 2, wherein the decision-making period is subdivided into a plurality of discovery periods in which multiple people or a single person is detected in the room.

5. A method, according to claim 4, wherein, for each of the discovery periods, a multi-person presence status is set to one of: yes, no, or uncertain according to the point cloud at different times during each of the discovery periods.

6. A method, according to claim 5, wherein the multi-person presence status of the decision-making period is determined by aggregating the multi-person presence statuses of each of the discovery periods.

7. A method, according to claim 6, wherein the aggregation uses probabilistic reasoning.

8. A method, according to claim 1, wherein detecting a point cloud includes using a tracking device to capture movements of the user.

9. A method, according to claim 8, wherein the tracking device uses radar.

10. A method, according to claim 1, wherein the size of the point cloud is compared with a size of a point cloud corresponding to a single user of the room.

11. A method, according to claim 10, wherein a presence of separate clusters of points in the point cloud is detected following determining that the size of the point cloud is larger than the size of the point cloud corresponding to a single user of the room.

12. A method, according to claim 11, wherein separate clusters of points are determined using projection-based clustering or Delaunay triangulation.

13. A method, according to claim 12, wherein the projection-based clustering includes projecting horizontal coordinates of points of the point cloud upon a series of horizontal directions and choosing one or more horizontal directions where the projections of two or more subsets of points are distinct and possess a maximum average distance between the projections of the adjacent subsets.

14. A method, according to claim 12, wherein the Delaunay triangulation is clustered based on cutting the graph of the Delaunay triangulation built for the top view of the point cloud into connected components according to lengths of the sides of triangles.

15. A method, according to claim 11, wherein a Kalman filter is used to track movement of people in the room.

16. A method, according to claim 15, wherein the Kalman filter uses bounding rectangles of horizontal coordinates of separate clusters of points in the point cloud as representations of dynamic objects.

17. A method, according to claim 1, wherein detecting one or more people entering or leaving the room includes previously detecting entrances of the room.

18. A method, according to claim 17, wherein previously detecting entrances of the room includes tracking movement of people in the room and determining a location where movement results in more or less people in the room.

19. A method, according to claim 18, wherein an entrance is detected when a person in the room is detected to be walking toward a boundary of the room and, subsequently, the person is no longer detected as being in the room.

20. A non-transitory computer readable medium containing software that detects multiple people in a room, the software comprising:
   executable code that detects a point cloud corresponding to at least one user moving in the room;
   executable code that forms a bounding box corresponding to coordinates of points of the point cloud;
   executable code that determines if the point cloud corresponds to multiple people based on at least one of: a size of the point cloud, a presence of separate clusters of points in the point cloud, or detecting one or more people entering or leaving the room; and
   executable code that obtains vital signs of a user in the room in response to there being only being a single person in the room.

21. A non-transitory computer readable medium, according to claim 20, wherein vital signs of the user are obtained at an end of a decision-making period in response to a single person being in the room during the decision-making period.

22. A non-transitory computer readable medium, according to claim 21, wherein the decision-making period is one minute.

23. A non-transitory computer readable medium, according to claim 21, wherein the decision-making period is subdivided into a plurality of discovery periods in which multiple people or a single person is detected in the room.

24. A non-transitory computer readable medium, according to claim 23, wherein, for each of the discovery periods, a multi-person presence status is set to one of: yes, no, or uncertain according to the point cloud at different times during each of the discovery periods.

25. A non-transitory computer readable medium, according to claim 24, wherein the multi-person presence status of the decision-making period is determined by aggregating the multi-person presence statuses of each of the discovery periods.

26. A non-transitory computer readable medium, according to claim 25, wherein the aggregation uses probabilistic reasoning.

* * * * *